United States Patent
Chang

[11] 3,832,583
[45] Aug. 27, 1974

[54] SQUIRREL CAGE MOTOR WITH IMPROVED ROTOR BAR SECURING ARRANGEMENT

[75] Inventor: Chen-Kuo Chang, Depew, N.Y.

[73] Assignee: Westinghouse Electric Corporation, Pittsburgh, Pa.

[22] Filed: Mar. 8, 1973

[21] Appl. No.: 339,492

[52] U.S. Cl.................. 310/201, 310/51, 310/211
[51] Int. Cl. ............................................ H02k 3/04
[58] Field of Search ............. 310/211, 51, 125, 214, 310/217, 218, 219, 261, 262, 263, 264, 265, 201, 182

[56] References Cited
UNITED STATES PATENTS

| | | | |
|---|---|---|---|
| 2,087,406 | 7/1937 | Hutchins | 310/211 |
| 2,292,167 | 8/1942 | Smith | 310/211 |
| 2,316,635 | 4/1943 | Staak | 310/51 |
| 2,370,458 | 2/1945 | Goran | 310/211 |
| 2,386,138 | 10/1945 | Pancher | 310/211 |
| 2,643,351 | 6/1953 | Feiertag | 310/51 |
| 3,401,280 | 9/1968 | Lackey | 310/211 |
| 3,488,532 | 1/1970 | Endress | 310/211 |
| 3,621,315 | 11/1971 | Dalmo | 310/214 |

*Primary Examiner*—R. Skudy
*Attorney, Agent, or Firm*—G. H. Telfer

[57] ABSTRACT

A squirrel cage motor has its rotor bars located in core slots with indentations in the slot walls into which material of the bars is forced, such as by swaging, in order to restrain the bars from vibration in use.

3 Claims, 4 Drawing Figures

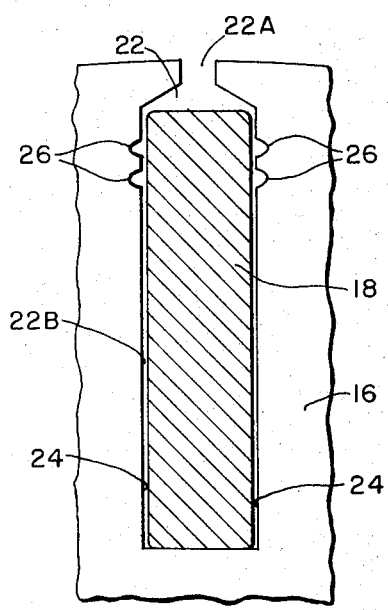
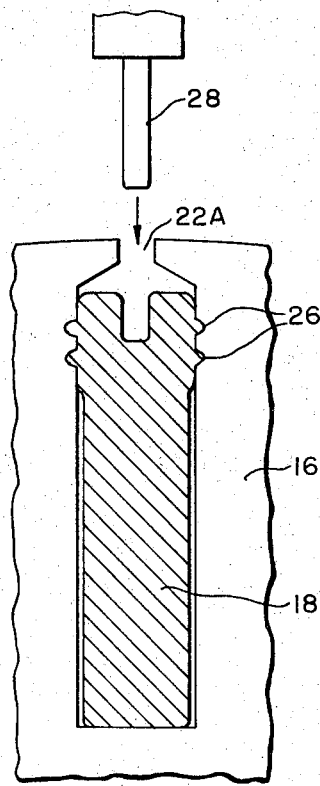
FIG. 2.   FIG. 3.
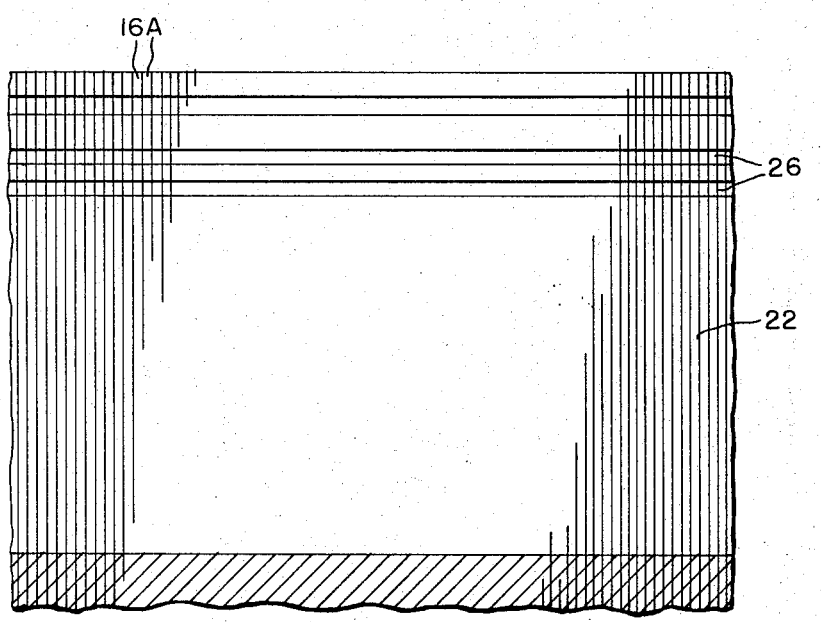
FIG. 4.

SQUIRREL CAGE MOTOR WITH IMPROVED ROTOR BAR SECURING ARRANGEMENT

BACKGROUND OF THE INVENTION

This invention relates to dynamoelectric machines of the squirrel cage type and particularly to means for securing rotor bars therein.

It has been the practice in constructing larger sizes of squirrel cage motor rotors to drive rotor bars axially into core slots. Both the bars and slots have substantially rectangular cross sectional configurations with planar surfaces. After the bars are driven into the slots, before or after the end rings are brazed to the bars, a swage may be inserted into the slot openings with a force applied to bring the bars and slot surfaces into closer engagement. While this arrangement has been widely used and is generally successful, it is still the case that vibration of the rotor bars may occur in extremely severe use that in some instances reaches the point of causing fatigue failure of the bars. An improved securing arrangement is particularly desirable with bars that are thin.

SUMMARY OF THE INVENTION

In accordance with this invention, a squirrel cage motor has its rotor bars located in core slots with indentations in the slot walls into which material of the bars is forced, such as by swaging, in order to restrain the bars from vibration in use.

The present invention introduces essentially no complication to the present manufacturing scheme for squirrel cage rotors. The bars may be inserted into the core slots by inserting or axially driving them by pounding with a mallet or using a hydraulic ram. After locating the bars in the slots, before or after the brazing of the end rings, a swaging tool may be applied to them by insertion into the slot opening with application of sufficient force to cause some of the material of the bars to be deformed and enter into the indentations in the slot walls. This, therefore, achieves positive locking of the bars within the slots.

BRIEF DESCRIPTION OF THE DRAWING

FIG. 2 is a partial cross sectional view of one embodiment of the present invention at a preliminary stage in the fabrication process;

FIG. 3 is a partial cross sectional view of a squirrel cage rotor in accordance with this invention after completion; and, FIG. 4 is a partial sectional view of a rotor slot in accordance with an embodiment of this invention taken from inside the slot.

DESCRIPTION OF THE PREFERRED EMBODIMENTS

Figure 1:
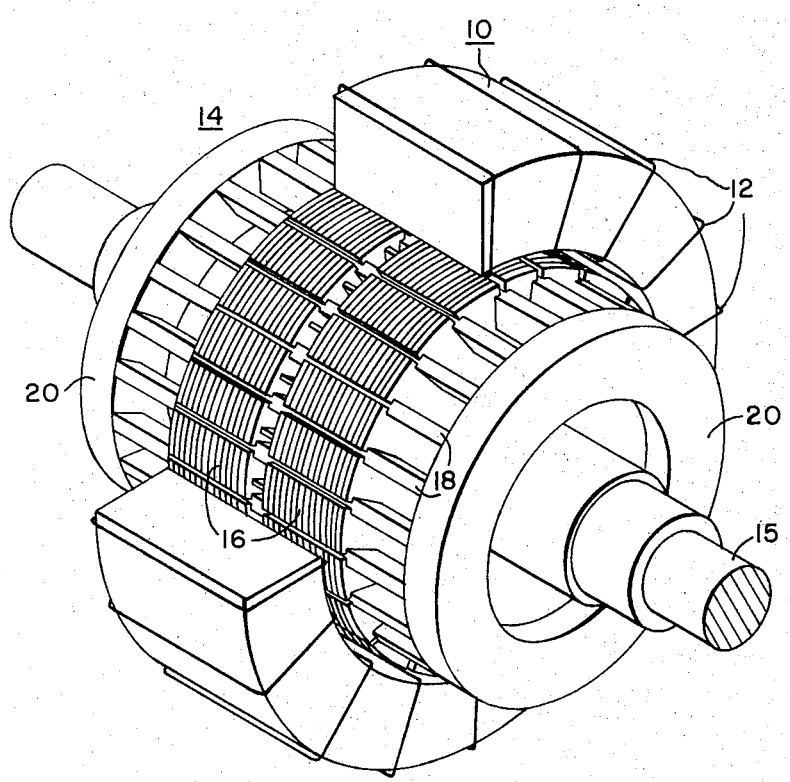
FIG. 1 is a general perspective view, partly broken away, of the principal elements of a squirrel cage motor to which the present invention may be applied.

FIG. 1 shows an example of a known type of squirrel cage motor to which the present invention may be advantageously applied. A stator core 10, with windings 12 thereon, concentrically encloses a squirrel cage rotor 14. Rotor 14 is rotatable about shaft 15 and includes a magnetic core 16 that normally comprises a plurality of stacked laminations as can be better seen in FIG. 4. The core 16 has a plurality of rotor bars 18 located in core slots running substantially axially from end to end of the core. The bars 18 are joined, such as by brazing, to end rings 20 at the axial extremities of the core 16. The motor of FIG. 1 is one intended for three phase operation which is merely an example of one common type.

FIGS. 2 and 3 show a single rotor bar 18 in a slot 22 of core 16. The laminations 16A (FIG. 4) of core 16 are punched so that upon stacking them in a predetermined orientation the core slots 22 are defined. The slots 22 characteristically have a narrow slot opening 22A and a substantially rectangular portion 22B. The latter portion 22B accommodates a substantially rectangular rotor bar 18 that has been driven axially therein. The slots and the bars may be of other shapes, such as L-shape.

As shown in FIG. 2 the bar 18 does not tightly fill the slot 22 when originally inserted. Naturally the axial insertion requires some clearance.

In a departure from past practice, the slot walls 24 that extend substantially radially outward are not planar but rather at least one, and preferably both, contain indentations 26. The indentations 26, in one preferred form, are one or more longitudinally extending grooves. In the present example, two such grooves are employed in each core slot surface 24. However, the indentations may take numerous other configurations.

It is of course the case that the indentations 26 are greater in size than normally occurring variations in walls 24 resulting from dimensional irregularities of laminations 16A. Preferably, also, the indentations should extend the length of the core 16, although spaced indentations would be suitable but less preferred because of the need to provide differently configured laminations.

It is important in order to obtain the intended benefits of the invention that the indentations 26 be located near the top (radially outward top half) of surfaces 24.

FIG. 3 shows the structure of FIG. 2 after there has been applied to the top of bar 18 through the core slot opening 22A a swaging tool 28 so as to deform material of the bar 18 into the grooves 26 for positively locking the bar in place. As can be seen, the bottom half of the bar 18 may still not intimately engage the slot walls but this circumstance is without consequence. Brazing of the ends of bars 18 to end rings 20 may be performed either before or after the swaging operation.

I claim:

1. A dynamoelectric machine of the squirrel cage type comprising: a stator; a rotor located concentrically within said stator, said rotor comprising a magnetic core that includes a plurality of stacked laminations, said core having a plurality of slots extending therein from the rotor surface and extending longitudinally from end to end of said core, and a rotor bar of conductive material located in each of said slots, said slots, each having a substantially rectangular portion having two inner surfaces extending substantially radially in said core and each having at least one indentation, material of each of said bars being intimately disposed in said at least one indentation for securing said bars from vibration while portions of said bars removed from said at least one indentation are free of intimate engagement with said surfaces.

2. The subject matter of claim 1 wherein: said at least one indentation comprises at least one longitudinally extending groove in each of said inner surfaces of said slots.

3. The subject matter of claim 1 wherein: said at least one indentation is located in said surfaces within the radially outwardly top half thereof.

* * * * *